Sept. 27, 1955 H. B. REX 2,719,192

AMPLIFIER CONTROL, INCLUDING AN ELECTROSTATIC VALVE

Filed April 24, 1953

INVENTOR.
HAROLD B. REX

BY
G. D. O'Brien
Q. Baxter Warner
ATTORNEYS

United States Patent Office 2,719,192

Patented Sept. 27, 1955

2,719,192

AMPLIFIER CONTROL, INCLUDING AN ELECTROSTATIC VALVE

Harold B. Rex, Falls Church, Va.

Application April 24, 1953, Serial No. 351,064

1 Claim. (Cl. 179—171)

Figure 1:
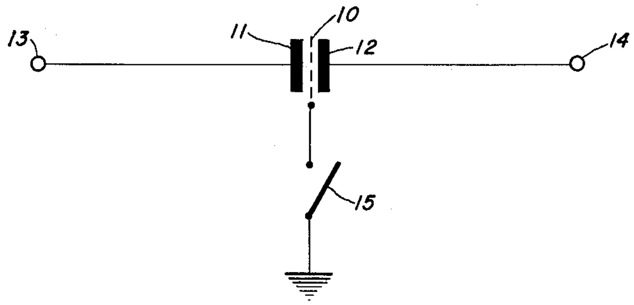

(Granted under Title 35, U. S. Code (1952), sec. 266)

The invention described herein may be manufactured and used by or for the Government of the United States of America for governmental purposes without the payment of any royalties thereon or therefor.

The present invention relates to capacity coupling devices and more particularly to a combined capacitor and valve for controlling the amount of current passing between the plates of a capacitor.

The need has long been recognized for a combined electrostatic valve and capacitor device which can be used for the control of emission of certain frequencies from several types of electrical devices such, for example, as electrical oscillators of the variable frequency type. Radiation from such oscillators may be prevented by employing radio frequency filters in each power lead entering the box. However, the problem of valving the radio frequency out of the oscillator has remained.

As will be more fully appreciated as the description proceeds, the present invention contemplates a device whereby a particular frequency such, for example, as the radio frequency of a variable frequency oscillator may be controlled by a valving action to thereby allow either none, a portion, or all of the radio frequency to be passed out of the circuit to ground, depending upon the operation desired.

In order that such a function may be accomplished, the present invention employs an electrostatic shielding element such, for example, as a Faraday shield placed between the plates of a suitable capacitor, the shielding element being connected to ground or a return power lead by a switch or some other suitable component for varying and controlling the amount of radio frequency current passing to ground or the return power lead, as the case may be.

It will be apparent to those skilled in the art that several types of components may be substituted for the switch such as variable capacitors, variable resistors, inductors, or any combination of such components as may be suitable for achieving the particular results desired.

Therefore, one of the objects of the present invention resides in the provision of a capacitor coupling device for producing a valving action upon the emission of particular frequencies and passing the unwanted portion thereof to ground or a return power lead.

Another object of the present invention is the provision of a valving mechanism or component connected between ground and a capacity shielding element disposed within a capacitor.

An additional object resides in the provision of a Faraday shield disposed between the plates of a capacitor and a device for controlling the shielding effect of the Faraday shield connected between the shield and ground.

Still another object of the present invention resides in the provision of an electrostatic shielding element disposed between the plates of a capacitor and a switch connected between the shielding element and ground.

Another object resides in the provision of a rugged, economically manufactured, and readily assembled capacity coupling device for accomplishing the foregoing objects.

Figure 3:
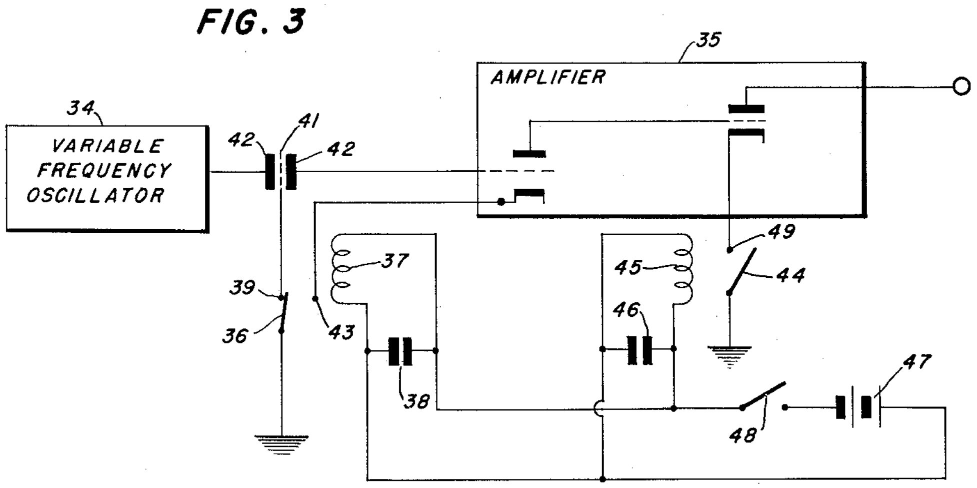
Figure 2:
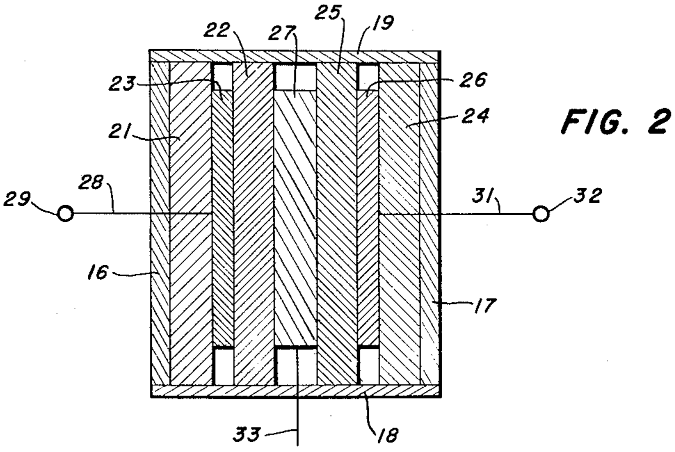

Other objects and many of the attendant advantages of this invention will be readily appreciated as the same becomes better understood by reference to the following detailed description when considered in connection with the accompanying drawings wherein:

Fig. 1 is a schematic illustration of the manner in which the present invention may be employed to valve either all or none of the current on one of the capacitor plates to ground;

Fig. 2 is a vertical section view of a capacitor having a Faraday shield disposed between the capacitor plates thereof and including a connection to the Faraday shield which may be connected to any type valving component desired depending upon the results to be achieved; and Fig. 3 is a schematic illustration of the present invention as employed in connection with a variable frequency oscillator and a two-stage amplifier.

Referring now to the several figures of the drawings and more particularly to Fig. 1 thereof, it will be observed that a capacity shielding element is disposed between capacitor plates 11 and 12 respectively connected to input terminal 13 and load terminal 14. Shield 10 is connected to ground through a switch 15. When switch 15 is closed, electrostatic coupling between plates 11 and 12 is prevented and no electrostatic flux can link the condenser plates. When switch 15 is opened the electrostatic flux may link the capacitor plates 11 and 12 and current will pass to the load terminal 14. Thus, the opening and closing of switch 15 permits shield 10 to be either disconnected or connected to ground as the case may be and thereby provides a valving action of the flow of current between plates 11 and 12.

One type of capacitor with which the present invention may be employed is disclosed in Fig. 2. A housing comprising side walls 16 and 17, bottom wall 18 and top wall 19 encloses insulating blocks 21 and 22 spaced on one side of the housing to receive a capacitor plate 23 disposed therebetween. It will be noted that a corresponding arrangement exists on the other side of the capacitor, insulating elements 24 and 25 being spaced to accommodate capacitor plate 26 therebetween. A capacity shielding element such as a Faraday shield 27, for example, is positioned between insulating elements 22 and 25. Insulating element 21 and side wall 16 are provided with registering apertures through which a conductor 28 may be withdrawn from its point of connection on the outer face of capacitor plate 23 and connected to terminal 29. Similarly, on the opposite side of the insulating element 24 and side wall 17 are provided with small registering apertures through which conductor 31 may be withdrawn from its point of connection with the outer surface of capacitor plate 26 and connected to terminal 32. The bottom wall 18 is also provided with an aperture through which conductor 33 may be withdrawn from its connecting point at the bottom end of the Faraday shield and connected to a valving device such as switch 15 in Fig. 1, for example, and then connected to ground.

One application of the present invention is disclosed in Fig. 3 wherein the capacity coupling device is shown connected between the variable frequency oscillator 34 and a two stage amplifier 35, the oscillator and amplifier being diagrammatically illustrated. It will be observed that in the specific manner in which the invention is employed in Fig. 3 that the switch arm 36 functions as the armature of a relay having an inductive winding 37 and a capacitor 38 connected thereacross. Terminal 39 is connected to the shielding element 41 which is positioned between the plates of a capacitor 42. Terminal 43 may be connected to the cathode in the first stage of amplifier 35. Another armature 44 is provided and is actuated by inductive winding 45 having capacitor 46 connected thereacross. The relay circuit having armatures 36 and 44 is supplied by battery 47 and is closed by a key 48. Terminal 49 may be connected to the cathode in the second stage of amplifier 35.

When key 48 in Fig. 3 is closed current will flow through the inductive windings 37 and 45 for different time intervals because of the different time constants of the two legs of the relay circuit. When current flows through inductive winding 37, armature 36 is actuated to break from terminal 39 and make with terminal 43 thereby enabling an electrostatic flux to be established linking the plates 42 of the capacitor and connect the cathode of the first stage of the amplifier 35 to ground. Similarly, when current flows in the relay circuit armature 44 will make contact with terminal 49 to thereby connect the cathode in the second stage of the amplifier circuit to ground.

It will be understood that the specific manner in which the present invention is employed in Fig. 3 is merely illustrative of one application therefor and that there are many additional circuits with which the invention may be employed.

Obviously many modifications and variations of the present invention are possible in the light of the above teachings. It is therefore to be understood that within the scope of the appended claim the invention may be practiced otherwise than as specifically described.

What is claimed is:

A system for controlling the emission of radio frequency currents from an oscillator to an amplifier comprising a capacitor connected between the oscillator and the amplifier, an electrostatic shield disposed between the plates of said capacitor, a first relay having the armature thereof connected to ground and biased into contact with said shield for normally connecting the latter to ground, said relay further including an inductive winding for actuating said armature out of contact with said shield to thereby disconnect said shield from ground, a pair of electron tubes in the amplifier, a terminal connected to the cathode of a first electron tube of the amplifier, said armature being actuated into engagement with said terminal to connect said cathode to ground when current flows through said inductive winding and said shield is disconnected from ground, a second relay including an armature connected to ground, a second terminal connected to the cathode of a second electron tube of the amplifier, said second relay further including an inductive winding for actuating said armature into contact with said second terminal to connect the cathode of said second electron tube to ground in response to current flowing through the inductive winding of said second relay simultaneously with the flow of current through the inductive winding of said first relay whereby the amplifier is set in operation, the cathode circuits of both said electron tubes being open circuited except when connected to ground by their respective relays, a source of power connected to said relays, and means for opening and closing the circuit between said inductive windings and said source of power, said amplifier being inoperative and shielded from the oscillator when the circuit between the inductive windings is open and operative when the latter circuit is closed.

References Cited in the file of this patent

UNITED STATES PATENTS

| | | |
|---|---|---|
| 1,952,924 | Koch | Mar. 27, 1934 |
| 2,026,874 | Eitel et al. | Jan. 7, 1936 |